United States Patent [19]
Portmann

[11] 4,429,955
[45] Feb. 7, 1984

[54] PASSIVE ELECTRO-OPTICAL DISPLAY WITH SCREEN AND CONTROL ELECTRODES

[75] Inventor: Hubert Portmann, Rothenburg, Switzerland

[73] Assignee: Asulab S.A., Neuchatel, Switzerland

[21] Appl. No.: 298,495

[22] Filed: Sep. 1, 1981

[30] Foreign Application Priority Data

Sep. 15, 1980 [CH] Switzerland .................. 6897/80

[51] Int. Cl.³ ............................................... G02F 1/13
[52] U.S. Cl. ..................................... 350/332; 350/336
[58] Field of Search ............ 350/332, 334, 336, 339 R, 350/356, 357, 392; 340/784, 765, 785, 787

[56] References Cited

U.S. PATENT DOCUMENTS 3,787,834  1/1974  Elliott ................................ 340/784
4,277,786  7/1981  Waldron ............................. 380/336

FOREIGN PATENT DOCUMENTS 56-31127  3/1981  Japan ................................ 340/784

OTHER PUBLICATIONS

Kmetz, "Matrix Addressing of Non-Emissive Displays", *Non-Emissive Electro Optic Displays* (pp. 261-289), 1975.

*Primary Examiner*—John K. Corbin
*Assistant Examiner*—David Lewis
*Attorney, Agent, or Firm*—Spensley, Horn, Jubas & Lubitz

[57] ABSTRACT

A passive electro-optical display cell comprising, on the internal face of each of its plates, at least one of which is transparent, sets of control electrodes and sets of screen electrodes, the control electrodes and the screen electrodes being separated by an insulating layer. The screen electrodes and the insulating layers have apertures therein facing the control electrodes. In order to reduce the number of conducting tracks, the cell is controlled by multiplexing. This type of control is made possible by virtue of the particular combination of the control electrodes and the screen electrodes. The control and screen electrodes of either plate will select two segments for display, but a selection between the two segments is made possible because they face different screen electrodes of the other plate. Such a cell makes it possible to display more data than a normal cell and may be used in an electronic watch which has a large number of functions.

3 Claims, 4 Drawing Figures

1234

14 23

| | | |
|---|---|---|
| 1,2,3,4,5,6<br>16,17,18,19,20 | 2<br>0 |  |
| 7,8,9,10,11,12,13,14,15,21 | 2<br>0 |  |
| 22 | +1<br>-1 |  |
| 23 | +1 |  |
| 24 | +1<br>-1 |  |
| 25 | +1<br>-1 |  |
| 26 | +1<br>-1 |  |
| 27 | +1<br>-1 |  |
| 28 | -1 |  |
| 29 | +1<br>-1 |  |
| 30 | +1 |  |
| 31 | +1<br>-1 |  |
| 32 | -1 |  |
| 33 | -1 |  |
| 34 | -1 |  |
| 35 | +1<br>-1 |  |
| 36 | +1 |  |
| 37 | +1 |  |

PASSIVE ELECTRO-OPTICAL DISPLAY WITH SCREEN AND CONTROL ELECTRODES

BACKGROUND OF THE INVENTION

1. Field of the Invention

The present invention relates to a passive electro-optical display cell and, more particularly, to a passive electro-optical display cell comprising a layer of an electro-optical material interposed between two plates, at least one of which is transparent, in which control of the cell is achieved through multiplexing.

2. Description of the Prior Art

U.S. Pat. No. 4,137,524 describes a passive electro-optical display cell comprising a layer of a passive electro-optical material interposed between two plates, at least one of which is transparent, and which further comprises control electrodes and a counter-electrode which are disposed on respective sides of the layer of electro-optical material. A screen electrode is disposed between the control electrodes and the electro-optical material. The screen electrode has an opening facing each of the control electrodes.

If the electro-optical material used is a nematic-phase liquid crystal, polarizing means are disposed on respective sides of the cell, with the directions of polarization thereof being at an angle of 90° relative to each other (crossed polarizers). Alignment layers are also deposited on the internal faces of the two plates in order to induce, in the absence of an electrical field, the helical configuration which is well known in display cells of the twisted nematic type.

In such a cell, the shape and dimensions of the openings in the screen determine the shape and the dimensions of the segments. The segments comprise the zones of the cell which may be made individually visible or invisible with respect to the background of the display and which, by virtue of the various combinations thereof, form different characters, such as numerals, letters or other symbols which are to be displayed.

In the background region of the display, outside the regions corresponding to the above-mentioned openings, the appearance of the cell depends only on the voltage applied between the screen and the counter-electrode. If that voltage is zero, the background of the cell appears light. If the voltage is sufficient for the field that it generates in the liquid crystal to cause alignment of the molecules of the liquid crystal in a direction perpendicular to the plates, the background of the cell appears dark.

At the location of the segments, it is the applied voltage between the control electrodes and the counter-electrode which determines the appearance of the cell. The cell is light in those regions where the applied voltage is zero and dark if the voltage is of sufficient value.

The presence of the screen, therefore, makes it possible to produce a display of data in the form of dark symbols on a light background, that is to say, a positive mode, or in the form of light symbols on a dark background, that is to say, a negative or reverse mode.

In other embodiments, a dichroic coloring agent and, optionally, a chiralic compound is added to the liquid crystal. At least one of the polarizing means may then be omitted. In contrast to the previously discussed case, the cell appears dark in the absence of an electrical field and light when there is such a field present. The mode of operation of this cell is, therefore, precisely the opposite to that described above, but the cell also has the property of permitting a positive or negative display.

In all cases, the presence of the screen also prevents the line of the conducting tracks which connect the electrodes to the terminals of the cell from becoming visible, in spite of the fact that the counter-electrode covers the whole of the rear plate. The problems involved in designing the counter-electrode of a conventional cell and reciprocal alignment of the electrodes and the counter-electrode are therefore eliminated.

A need presently exists for displaying more data than can be displayed by a normal cell. For example, when the cell is intended to be used in an electronic watch which has a large number of time-related or non-time-related functions, it is desirable to be able to display data in the form of numerals indicating the time and letters indicating the day of the week or the name of the month. This may be achieved by using characters which are all formed from a sufficient number of segments, but this is to the detriment of the aesthetic appearance of such characters.

It is sometimes also desirable for the cell to be capable of displaying data of a greatly different nature, such as a map of the world in two hemispheres, to make it possible to locate the position of the time zones in respect of which the time is indicated. This problem may be overcome by the superposition of two separate display cells, but this is at the disadvantage of cost and the thickness of the device.

As soon as the number of numerical, alphabetical or other symbols which can be displayed by a single cell is increased, problems arise in regard to connecting the different control electrodes. In particular, the number of lead-out wires typically increases to a very high level.

SUMMARY OF THE INVENTION

According to the present invention, there is provided a display cell which makes it possible to double the number of numerical, alphabetical or other symbols which may be displayed, without increasing either the surface area or the thickness of the cell, while also enjoying all of the advantages of the cell described in the beforementioned U.S. patent. According to the present invention, the number of output connections of such a passive electro-optical display cell can be reduced to an acceptable level.

Briefly, a passive electro-optical display cell constructed in accordance with the teachings of the present invention comprises a layer of a passive electro-optical material interposed between first and second plates, at least one of which is transparent, each of the plates carrying on its inner face control electrodes and at least one screen electrode, the screen electrodes having openings facing a part of the surface of each control electrode which is associated therewith, the openings in the screen electrodes defining the shapes of the segments to be displayed, at least the first plate carrying at least two screen electrodes, and at least two openings of the screen electrode of the second plate being disposed facing a common control electrode, each of these openings being disposed facing a different screen electrode of the first plate, and the openings associated with any one of the control electrodes being all formed in the same screen electrode.

OBJECTS, FEATURES AND ADVANTAGES

It is therefore an object of the present invention to solve the problems encountered heretofore in passive electro-optical display cells of the type described in the beforementioned U.S. patent. It is a feature of the present invention to provide a display cell which makes it possible to display the number of numerical, alphabetical or other symbols which may be displayed, without increasing either the surface area or the thickness of the cell. A further feature is the provision of a display cell which is controlled through multiplexing. An advantage to be derived is that the number of conducting tracks may be reduced. Still another advantage is a cell having a minimum surface area and thickness. Still another advantage is a cell which enjoys all of the advantages of the cell described in the beforementioned patent.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

DESCRIPTION OF THE PREFERRED EMBODIMENTS

Figure 1:
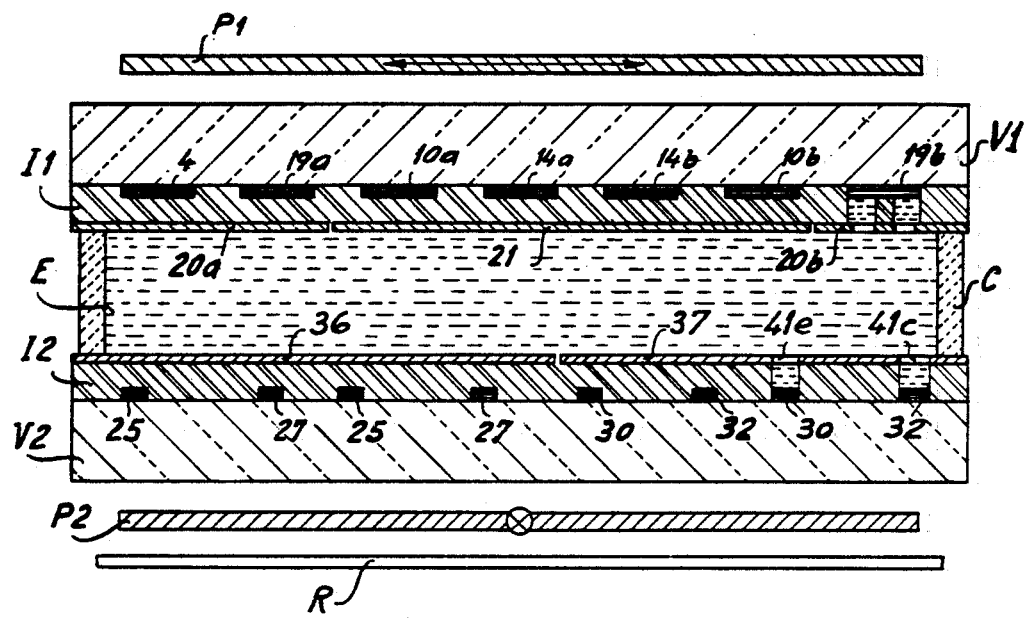
FIG. 1 is a cross-sectional view of a cell constructed in accordance with the teachings of the present invention, the control electrodes and the screen electrodes being viewed in section along the lines I—I, II—II, III—III and IV—IV in FIG. 2.
Figure 2:
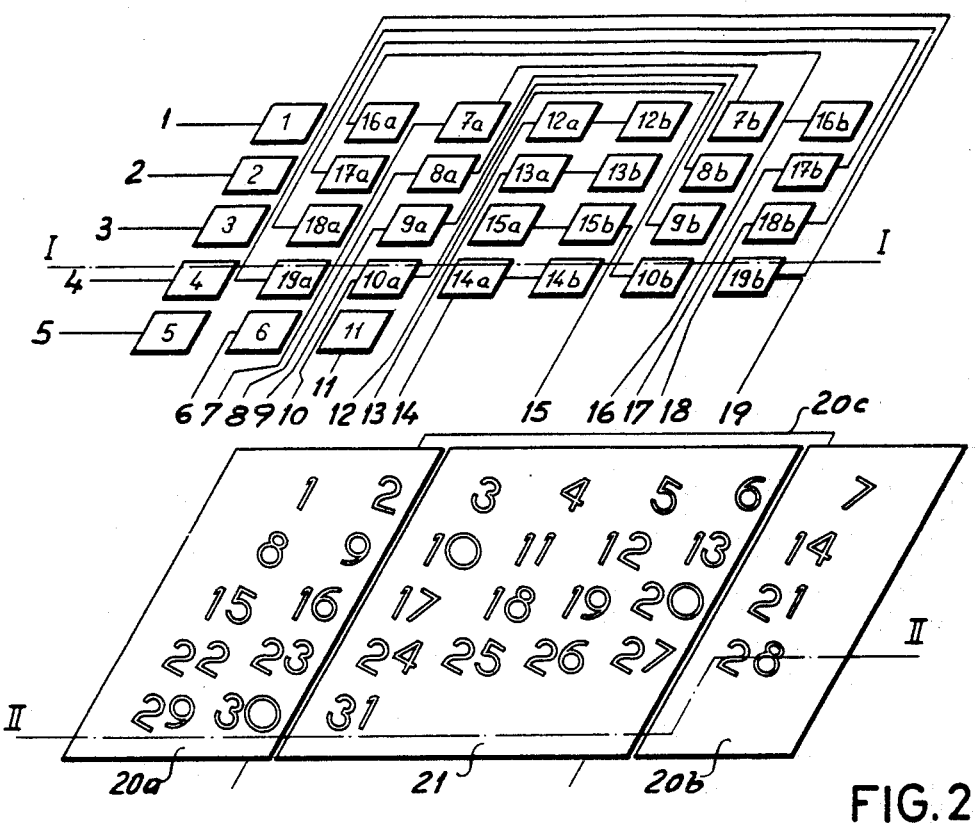
FIG. 2 is an exploded view of a portion of the cell of FIG. 1 illustrating the control electrodes and the screen electrodes.
Figure 2:
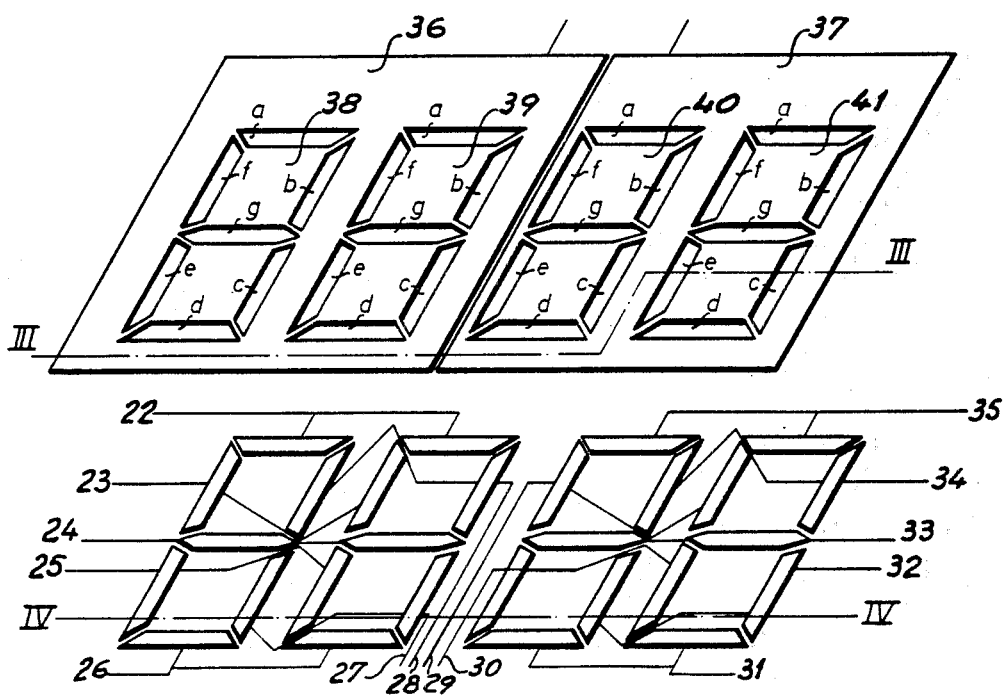

Referring now to the drawings and, more particularly, to FIGS. 1 and 2 thereof, a display cell constructed in accordance with the teachings of the present invention comprises two transparent glass plates, namely a front plate V1 and a rear plate V2, which are separated by a spacer frame C, comprising, for example, sintered glass, forming between plates V1 and V2 a space E which is filled with a nematic-phase liquid crystal material. The entire arrangement is interposed between two crossed polarizers P1 and P2, i.e. the light polarizing directions of which are substantially perpendicular to each other. A reflector-diffuser screen R is disposed at the rear of the cell.

On its inner face, plate V1 carries a first set of control electrodes which are generally designated from 1 to 19 and a first set of screen electrodes, generally designated 20 and 21, an insulating layer I1 being interposed between the control electrodes and the screen electrodes. Control electrodes 1–19, insulating layer I1, and screen electrodes 20 and 21 are transparent. Insulating layer I1 and screen electrodes 20 and 21 are provided with openings which are each disposed facing one of control electrodes 1–19.

The electrodes which are numbered from 1 to 6 and 11 are each associated with a single opening provided in screen electrodes 20 or 21, while the electrodes 7 to 10 and 12 to 19 are associated with two openings in screen electrodes 20 or 21, the parts of the control electrodes which are denoted by the suffix a being disposed facing the first openings and the parts denoted by the suffix b being disposed facing the second openings. Furthermore, screen electrode 20 is divided into two parts 20a and 20b which are connected by a conducting area 20c.

Rear plate V2 is provided with a second set of control electrodes 22 to 35, each of which being divided into two parts which are interconnected. Rear plate V2 is also provided with a second set of screen electrodes 36 and 37, an insulating layer I2 being interposed between control electrodes 22 to 35 and screen electrodes 36 and 37. Electrodes 22 to 35, insulating layer I2 and screen electrodes 36 and 37 are also transparent. Just as in the case of plate V1, insulating layer I2 and the second set of screen electrodes 36 and 37 having openings which are disposed facing one of the electrodes of the second set of control electrodes.

The shape, dimensions and arrangement of the openings in insulating layer I1 and in screen electrodes 20 and 21 define the configuration of the segments which can be displayed by means of control electrodes 1 to 19. The shape, dimensions and arrangement of the openings in insulating layer I2 and in screen electrodes 36 and 37 define a second segments configuration. These segments can be displayed by means of control electrodes 22 to 35.

Screen electrodes 20 and 21 have openings defining segments which are in the shape of Arabic numerals ranging from "1" to "31". It should be noted that in this case, each segment itself represents a complete symbol. Control electrodes 1 to 19 and screen electrodes 20 and 21 are so arranged that a control electrode is disposed facing each opening in screen electrodes 20 and 21, the control electrode entirely covering that opening.

Thus, the figure "1" is represented by an opening in part 20a of screen electrode 20. Control electrode 1 is disposed facing that opening, control electrode 1 being associated only with one opening. The figure "2" is represented by an opening in part 20a of screen electrode 20. Portion 16a of control electrode 16 is disposed facing that opening. The surface 16b of the same control electrode 16 is disposed facing the opening representing the figure "7", which is provided in portion 20b of screen electrode 20. The control electrodes which are numbered from 1 to 6 and from 16 to 19 are associated with openings in screen electrode 20. The control electrodes which are numbered from 7 to 15 are associated with openings in screen electrode 21.

Screen electrodes 36 and 37 have openings representing four 7-segment display elements, generally designated 38 to 41. For each display element, the openings defining the different segments are identified by a letter ranging from a to g. One of control electrodes 22–35 is disposed facing each opening in screen electrodes 36 and 37. In this case, each control electrode is associated with two openings. Thus, for example, control electrode 22 is associated with openings 38a and 39a in screen electrode 36. Control electrodes 22 to 28 are associated with openings in screen electrode 36, whereas control electrodes 29 to 35 are associated with openings in screen electrode 37.

Front plate V1 and rear plate V2 of the display cell are aligned with respect to each other as follows. Part 20a of screen electrode 20 is disposed facing element 38 formed in screen electrode 36. Part 20b of screen electrode 20 is disposed facing element 41 formed in screen electrode 37. Screen electrode 21 is disposed facing elements 39 and 40 formed in screen electrodes 36 and 37, respectively. Screen electrode 36 is disposed facing the openings in part 20a of screen electrode 20 representing the numbers "1", "2", "8", "9", "15", "16", "22", "23", "29", and "30" and the openings in screen electrode 21 representing the numbers "3", "4", "10", "11", "17", "18", "24", "25", and "31". Screen electrode 37 is disposed facing the openings provided in screen electrode 21 representing the numbers "5", "6", "12", "13", "19", "20", "26", and "27" and the openings in part 20b of screen electrode 20 representing the numbers "7", "14", "21" and "28".

Each of plates V1 and V2 is also covered internally, over its entire surface area, with a homogenous planar alignment layer for the liquid crystal molecules (layer not being shown in the drawing). These alignment layers are such that, in the absence of an electrical field, the molecules of the liquid crystal which are in contact with the layers are all substantially parallel to plates V1 and V2 and also substantially parallel to the direction of polarization of the polarizer P1 and P2, respectively. A protective layer, for example, silicon oxide, which is also not shown in the drawing, may (if needed) be deposited over the whole of the surface of plates V1 and V2, before the alignment layers are deposited.

In operation, the control electrode associated with the opening corresponding to the segment to be displayed is raised to a first potential. The screen electrode in which the opening corresponding to the segment to be displayed is formed is raised to a second potential. The control electrodes corresponding to the segments which are not to be displayed and corresponding to openings of the first screen electrode are at the same second potential as the screen electrode. The assembly formed by the screen electrode which does not have the segment to be displayed, but which is disposed facing that segment, and the control electrodes associated with this screen electrode, are raised to a third potential. The assemblies formed by the screen electrodes which do not have the segment to be displayed and which are not disposed facing that segment, and the control electrodes which are associated therewith, are raised to a fourth potential.

These potentials are such that the difference between the first and the third potentials is greater than the threshold voltage of the electro-optical material which is interposed between plates V1 and V2. On the other hand, the differences between the first and fourth potentials, the second and third potentials, and the second and fourth potentials, are all less than the threshold voltage of the electro-optical material.

Figure 3:
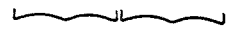
FIG. 3 is a diagram showing an example of the manner in which the cell of FIG. 1 may be controlled in order to display the number "1 2 3 4"
Figure 3:
Figure 3:
Figure 3:
Figure 3:
Figure 3:
Figure 3:
Figure 3:
Figure 3:
Figure 3:
Figure 3:
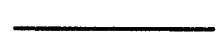
Figure 3:
Figure 3:
Figure 3:
Figure 3:
Figure 3:
Figure 3:
Figure 3:

FIG. 3 shows an actual example of the way in which the display cell may be controlled. In this case, the cell is to display the number "1 2 3 4". This information is displayed by means of display elements 38 to 41. Control of the display is effected in two successive sequences, the first being in respect of displaying the numbers "1" and "4", and the second being in respect of displaying the numbers "2" and "3".

Screen electrode 20 and control electrodes 1 to 6 and 16 to 19 are at the same potential. Screen electrode 21 and control electrode 7 to 15 are also at the same potential. Each of these equipotential assemblies plays the part of a counter-electrode.

The information is displayed by activating segments 38b and 38c for the figure "1", segments 39a, 39b, 39d, 39e and 39g for the figure "2", segments 40a, 40b, 40c, 40d and 40g for the figure "3" and segments 41b, 41c, 41f and 41g for the figure "4". The threshold voltage of the electro-optical material is between 1 and 3 (relative units).

In a first phase, the equipotential assembly comprising screen electrode 20 is raised to a potential +2 which is denoted hereinbefore as the "third potential". Screen electrode 21 is raised to a potential 0 (the "fourth potential"). Screen electrodes 36 and 37 are at a potential +1 (the "second potential"). The potential difference between screen electrodes 36 and 37 and screen electrode 20 is equal to 1 and is therefore below the threshold voltage. Those areas are not activated. During this first phase, the cell produces a display of the figures "1" and "4". For that purpose, electrodes 22 and 26 are at a potential +1, while electrodes 27 and 28 are at a potential −1 (the "first potential"). These electrodes produce the display of the number "1". Electrodes 30, 31 and 35 are at a potential +1, while electrodes 29 and 32 to 34 are at a potential −1. These electrodes produce the display of the number "4".

The potential difference between the assembly comprising screen electrode 20 and the electrodes at potential −1 is equal to 3. Since this value is higher than the threshold voltage of the electro-optical material, those areas are activated.

The potential difference between the assembly comprising screen electrode 21 and the electrodes at a potential −1 is equal to 1. Since this value is less than the threshold voltage, these areas are not activated.

The potential difference between the assembly comprising screen electrode 20 and the electrodes at a potential +1 is equal to 1. Since this value is less than the threshold voltage, these areas are not activated.

The potential difference between the assembly comprising screen electrode 21 and the electrodes at a potential +1 is equal to 1. Since this value is less than the threshold voltage, these areas are not activated. Therefore, only the numbers "1" and "4" appear.

In a second phase, the equipotential assembly comprising screen electrode 20 is set to a potential 0. The second assembly comprising screen electrode 21 is raised to a potential +2. Screen electrodes 36 and 37 are placed at a potential +1. The potential difference between screen electrodes 36 and 37 and screen electrode 20 is equal to 1. Since this value is lower than the threshold voltage, these areas are not activated.

During this second phase, the cell produces a display of the figures "2" and "3". For this purpose, electrodes 22, 24, 25, 26 and 28 are at a potential −1, electrodes 23 and 27 are at a potential +1 and electrodes 31 to 35 are at a potential −1. These electrodes produce a display of the number "3".

The potential difference between the assembly comprising screen electrode 21 and the electrodes at a potential −1 is equal to 3. Since this value is higher than the threshold voltage of the electro-optical material, these areas are activated.

The potential difference between the assembly comprising screen electrode 21 and the electrodes at a potential +1 is equal to 1. Since this value is lower than the threshold voltage of the electro-optical material, these areas are not activated.

The potential difference between the assembly comprising screen electrode 20 and the electrodes at a potential +1 is equal to 1. Since this value is lower than the threshold voltage of the electro-optical material, these areas are not activated.

As long as the information "1 2 3 4" is to be displayed, the procedure is cyclically repeated at a sufficiently high frequency for the four digits to appear simultaneously and continually by virtue of the inertia of the molecules of the liquid crystal.

Controlling information by means of electrodes carried by front plate V1 is effected in the same manner. In this case, the first equipotential assembly is formed by screen electrode 36 and control electrodes 22 to 28. The second equipotential assembly is formed by control electrodes 29 to 35 and screen electrode 37.

The above-described construction corresponds to two-phase multiplexing, both in regard to the control of data associated with upper plate V1 and with regard to data associated with lower plate V2. It will be appreciated that it is also possible to provide for multiplexing of the data associated with one of the plates only, control in respect of the other data being effected in accordance with the procedure described in commonly assigned U.S. patent application No. 06/250,056 filed on Apr. 1, 1981 and entitled Passive Electro-Optic Display Cell. The construction as illustrated in FIG. 1 herein may be so modified that only the data associated with front plate V1 is controlled in a multiplexed mode. In that case, the structure of the cell is modified so that front plate V1 has the same control electrode structure, but a single screen electrode and that on the rear plate, a control electrode is associated with each opening of the screen electrodes, of which there are still two.

It will be appreciated that multiplexing could be taken to an even more advanced degree. This would result in an increase in the number of screen electrodes, but a reduction in the number of control electrodes.

In another alternate form of the present invention, it is possible to envisage causing the simultaneous appearance of the data associated with plates V1 and V2 of the cell. If operation was in this way in regard to the cell shown in FIG. 2, the result would then be four-phase multiplexing, the first two phases causing the information associated with one of the plates to appear, while the following two phases causing the appearance of the information associated with the other plate.

By virtue of the present two-part arrangement of screen electrodes 20 and 21 and screen electrodes 36 and 37, it is possible for the number of outputs for supplying the control electrodes to be reduced virtually by half, which is a particularly attractive consideration in regard to a cell having a high data display capacity. By virtue of this solution, it is also possible to produce display cells for which the configuration of the control electrodes could not have been produced otherwise.

Figure 4:
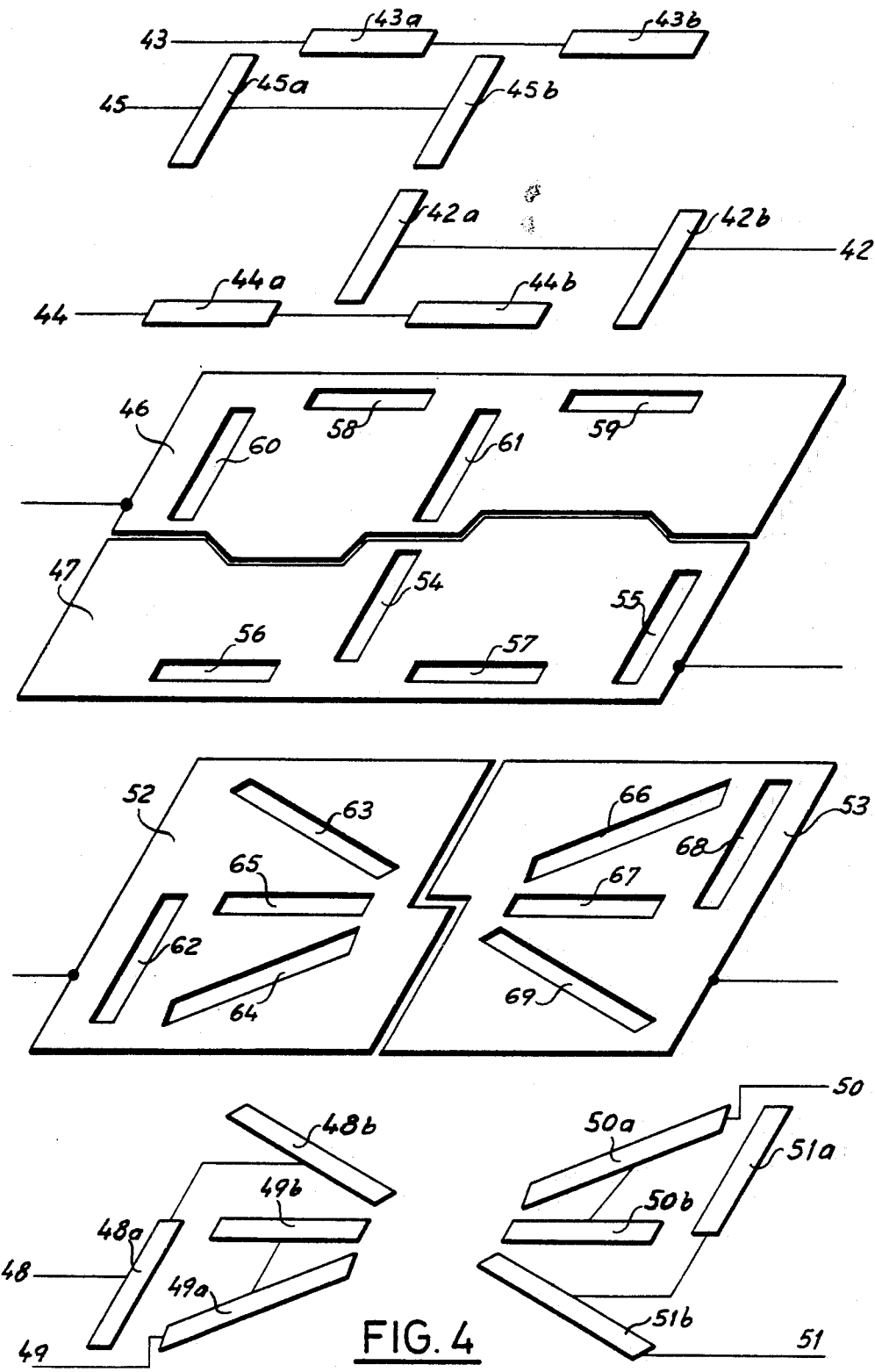
FIG. 4 is an exploded perspective view of another configuration of the control electrodes and screen electrodes of a display cell.

FIG. 4 illustrates a cell which provides a display in accordance with a sixteen-segment matrix. According to this embodiment, the first set of control electrodes comprises four electrodes 42 to 45, each electrode comprising two parts which are denoted by the letters a and b. The control electrodes 42 and 44 are associated with openings 54, 55 and 56, 57, respectively, in a screen electrode 47. Control electrodes 43 and 45 are associated with openings 58, 59 and 60, 61, respectively, in a second screen electrode 46. This assembly is disposed on the upper plate.

The lower plate comprises a second set of control electrodes 48 to 51, each electrode comprising two parts denoted by the letters a and b. Control electrodes 48 and 49 are associated with openings 62, 63 and 64, 65, respectively, in a screen electrode 52 while electrodes 50 and 51 are associated with openings 66, 67 and 68, 69, respectively, in a second screen electrode 53.

A cell of this kind is controlled in accordance with a four-phase multiplexing mode. The first, second, third and fourth phases permit control of the display relative to the segments associated with the openings carried respectively by the screen electrodes 46, 47, 52 and 53. In addition to a reduction in the number of connections, this solution also makes it possible to greatly simplify this topology of the electrodes in comparison with a conventional cell.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:
1. A passive electro-optical display cell comprising:
first and second spaced plates, at least one of which is transparent;
a layer of a passive electro-optical material interposed between said first and second plates;
control electrodes positioned on the inner face of each of said plates; and
at least one screen electrode positioned between each of said control electrodes and said electro-optical material layer, each screen electrode being provided with openings facing a part of the surface of each control electrode associated therewith, said openings defining the shapes of segments to be displayed;
at least the first plate carrying at least two screen electrodes, at least two openings of the screen electrode of the second plate being disposed facing a common control electrode, each of said at least two openings being disposed facing a different screen electrode of said first plate, the openings associated with any one of the control electrodes being all formed in the same screen electrode.
2. A display cell according to claim 1, wherein both of said plates carry at least two screen electrodes each, at least two openings of each of said screen electrodes being associated with the same control electrode.
3. A display cell according to claim 2, wherein one of said screen electrodes carried by one of said plates is divided into two portions which flank respective sides of the other screen electrode carried by the same plate.

* * * * *